United States Patent
Adams et al.

(10) Patent No.: US 8,953,901 B2
(45) Date of Patent: Feb. 10, 2015

(54) METHOD AND SYSTEM FOR APPLYING FILTER TO IMAGE

(75) Inventors: Dennis Adams, Madison, WI (US);
Nikolaos Georgis, San Diego, CA (US);
Zhenglu Wu, Middleton, WI (US)

(73) Assignee: Sony Corporation, Tokyo (JP)

( * ) Notice: Subject to any disclaimer, the term of this patent is extended or adjusted under 35 U.S.C. 154(b) by 331 days.

(21) Appl. No.: 13/349,369

(22) Filed: Jan. 12, 2012

(65) Prior Publication Data

US 2013/0182968 A1    Jul. 18, 2013

(51) Int. Cl.
*G06K 9/40* (2006.01)

(52) U.S. Cl.
USPC ............................. 382/264; 382/274; 382/275

(58) Field of Classification Search
None
See application file for complete search history.

(56) References Cited

U.S. PATENT DOCUMENTS

| | | | |
|---|---|---|---|
| 6,208,765 B1* | 3/2001 | Bergen | 382/268 |
| 6,457,032 B1* | 9/2002 | Silver | 708/315 |
| 7,397,964 B2 | 7/2008 | Brunner et al. | |
| 7,860,337 B2* | 12/2010 | Zimmer | 382/264 |
| 8,135,230 B2* | 3/2012 | Rempel et al. | 382/264 |
| 8,284,828 B2* | 10/2012 | Cooper et al. | 375/232 |
| 8,687,011 B2* | 4/2014 | Gong et al. | 345/587 |
| 2001/0013895 A1* | 8/2001 | Aizawa et al. | 348/222 |
| 2002/0093913 A1* | 7/2002 | Brown et al. | 370/232 |
| 2005/0147318 A1* | 7/2005 | Park et al. | 382/266 |
| 2012/0243792 A1* | 9/2012 | Kostyukov et al. | 382/199 |

* cited by examiner

*Primary Examiner* — Michelle Entezari
(74) *Attorney, Agent, or Firm* — Fitch, Even, Tabin & Flannery LLP

(57) ABSTRACT

A computer-implemented method for applying a filter to an image comprising: receiving a filter setting, selecting a selected filter from a family of filters stored on a computer-readable storage medium, based at least on the filter setting, wherein the family of filters comprises a plurality of filters each being an approximation of a function on different orders, and applying the selected filter to a stored image with a processor.

15 Claims, 4 Drawing Sheets

METHOD AND SYSTEM FOR APPLYING FILTER TO IMAGE

BACKGROUND OF THE INVENTION

1. Field of the Invention

The present invention relates generally to methods and systems for image processing, and more specifically to methods and systems for applying an image filter to an image.

2. Discussion of the Related Art

Digital image processing is the use of computer algorithms to perform image processing on digital images. Software implementations of image processing are increasingly used by both professional and casual user for editing and manipulating photographs, images, and videos. One common form of image manipulation is performed by applying a filter to an image. Depending on the filter used, a wide range of effects can be achieved. For example, a Gaussian blur filter, which blurs an image by a Gaussian function, produces the effect of viewing an image through a translucent screen.

SUMMARY OF THE INVENTION

A computer-implemented method for applying a filter to an image comprising: receiving a filter setting, selecting a selected filter from a family of filters stored on a computer-readable storage medium, based at least on the filter setting, wherein the family of filters comprises a plurality of filters each being an approximation of a function on different orders, and applying the selected filter to a stored image with a processor.

A system for applying a filter to an image comprising: a processor, a memory, and an input device. Upon execution of an executable program instructions stored on the memory by the processor, the system is configured to receive a filter setting from the input device, select a selected filter from a family of filters stored on the memory, based at least on the filter setting, wherein the family of filters comprises a plurality of filters each being an approximation of a function on different orders, and apply the selected filter to a stored image with a processor.

A computer-implemented method for applying a blur to an image comprising receiving a blur strength, determining a standard deviation value based at least on the blur strength, selecting a Gaussian blur filter from a family of Gaussian blur filters stored on a computer-readable storage medium based on the standard deviation value, determining parameters of the Gaussian blur filter, and applying the filter to a image with a processor.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
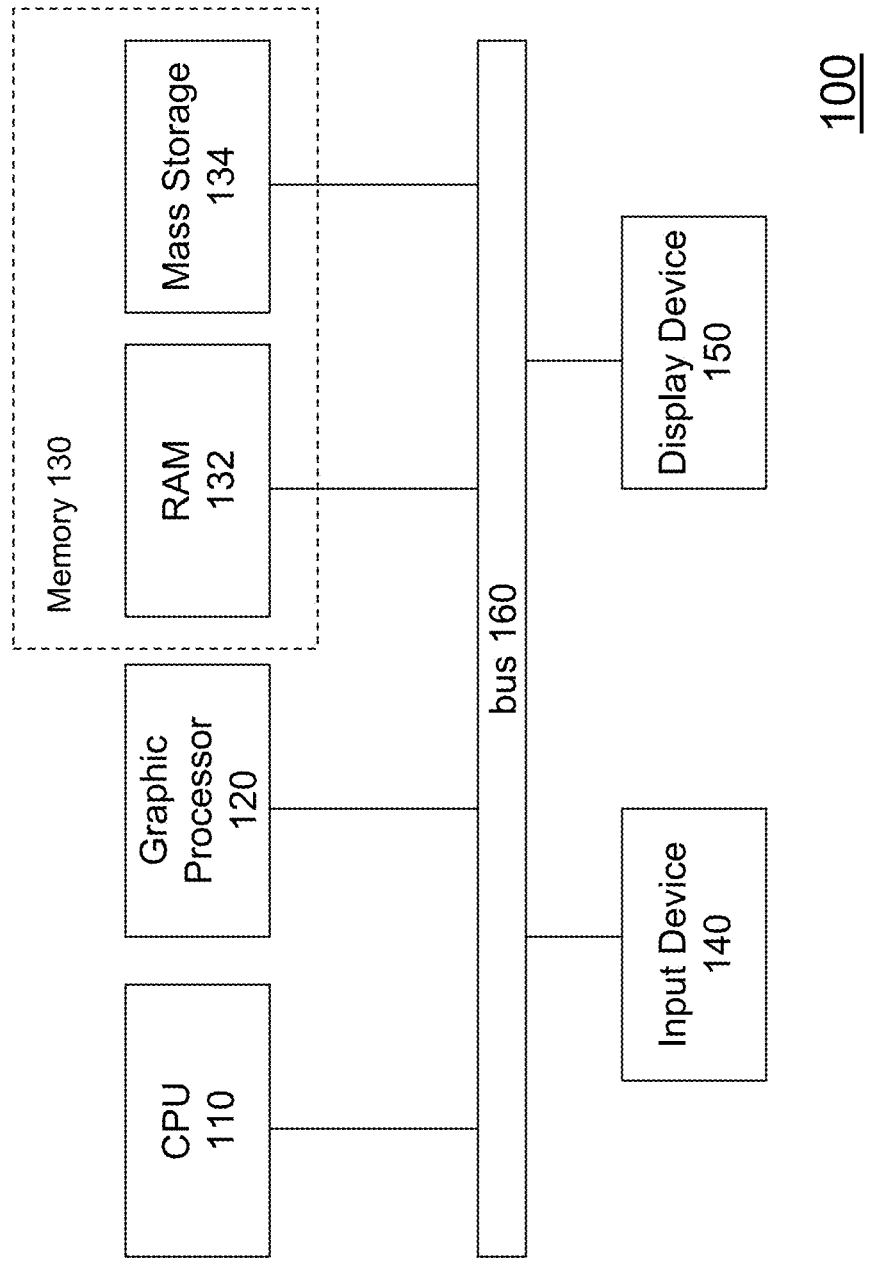
FIG. 1 is a block diagram of a computer system for applying a filter to an image, according to one or more embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a computer system is shown, generally designated at 100, which includes a central processing unit (CPU) 110, a graphic processor 120, a memory 130, an input device 140, and a display device 150, which are communicatively connected through a bus 160. The computer system 100 may be a personal computer device, a networked computer system, a computer server etc. The graphic processor 120 may be referred to as a graphic processing unit (GPU) or a visual processing unit (VPU). The memory 130 includes a random access memory (RAM) 132 and a mass storage 134, which may be a hard disk drive. While the CPU 110, the graphic processor 120, and the RAM 132 are shown as separate components, in some embodiments, the RAM 132 may be integrated with one or both of the CPU 110 and the graphic processor 120. In some embodiment, RAM 132 is shared dynamically by the CPU 110 and the graphic processor 120. In some embodiments, the RAM 132 is used by the CPU 110, and a second graphics RAM is dedicated for the use of the graphic processor 120. In some embodiments, the graphic processor 120 may be integrated with the CPU 110. In some embodiments, the computer system 100 lacks a dedicated graphic processor 120, and the CPU 110 is adapted to perform computations in place of the graphic processor 120. The CPU 110 and the graphic processor 120 may be operating in either the single precision floating point (32-bit) or the double precision floating point (64-bit) format.

The input device 140 may a commonly known device for providing user input to a computer system, such as a mouse, a keyboard, a touch pad, and/or a touch screen. The display device 150 may be a commonly known device for displaying images to a user. In some embodiments, the bus 160 includes a north bridge for connecting the CPU 110, the graphic processor 120, and the memory 130, and a south bridge for connecting the input device 140 and the display device 150.

In some embodiments, the input device 140 is adapted to provide command to apply a filter to an image file to the CPU 110. The command may be entered through a user interface, such as Sony Vegas Pro series software, displayed on the display device 150. For example, a user many select an image, select a type of filter from a list of available filters, and select a filter setting through the user interface. In some embodiment, the type of filter may be one of a Gaussian blur filter, an edge detection filter, a Retinex filter, or the Bilateral filter. The image may be a picture or a video. In some embodiments, the filter setting may be set separately for pixel row and pixel column. In some embodiments, the user may select a portion or portions of the image to apply the filter through the interface. In other embodiments, the application of the filter may be triggered by another program running on the computer device 100. The image file may be stored on the memory 130 and retrieved by the CPU 110 to be displayed on the display device 150. The memory 130 may also store a family of filters for each filter type that can be retrieved by the CPU 100 or the graphic processor 120 to apply to the image.

In response to a command to apply a filter to the image, the CPU 110 is adapted to execute codes stored in the memory to selects a filter from a family of filters. The family of filters may include a number of filters each being an approximation of a function on different orders. In some embodiments, the processor is also adapted to determine coefficients of the filter based on the filter setting inputted by the user through the input device 140. Throughout the descriptions, the filter coefficients are sometimes referred to as parameters. The CPU 110 may be adapted to select one of the filters from the family of filters based the filter setting. In some embodiments, the CPU 110 projects a computing resource demand from the filter setting, and selects a higher order filter from the filter family for a filter setting with lower projected computing resource demand, and a lower order filter form the filter family for a filter setting with higher projected computing resource demand. The graphic processor 120 is adapted to process the image with the selected filter to output a filtered image. The processing may be performed separately for the x-axis (pixel row) of the image and the y-axis (pixel column) of the image. The filter may be applied to a single image or a video comprising a series of still images, or a compressed video file. In some embodiments, the graphic processor 120 may be absent or otherwise unavailable on the computer system 100. In some embodiments, the CPU 110 is adapted to perform the filter application in place or in additional to the graphic processor 120. The filtered image may be displayed on the display device 150 and stored into the memory 130.

Figure 2:
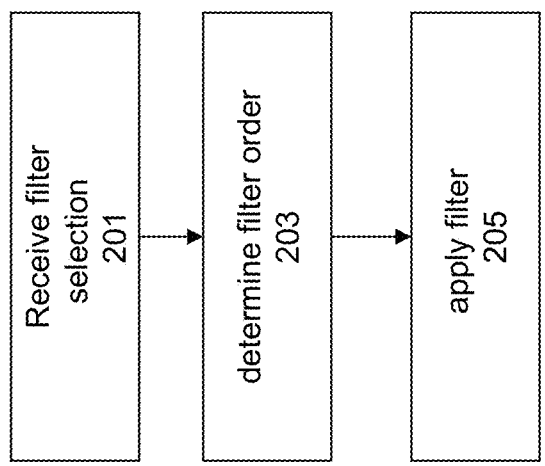
FIG. 2 is a flow diagram of a process of for applying a filter to an image, according to one or more embodiments.

Referring next to FIG. 2, a process for applying a filter to an image is shown. In step 201, a filter selection is received at a computer system. In some embodiments, the selection filter may be a blur filter, an edge detection filter, a Retinex filter, or a bilateral filter. Edge detection filter further be one of Roberts filter, Sobel filter, Prewitt filter, La Placian filter, or emboss filter. Generally, the selected filter may be any mathematical function used for image filtering that can be approximated by an infinite impulse response (IIR) filter. The filter selection may include a filter type and one or more settings of the filter. For example, for a blur filter, a blur strength setting may be inputted, and for an edge detection filter, a radius setting may be inputted. Generally, a filter setting may be a parameter that affects the computing resource needed to apply the filter. The filter selection may be entered through a provided interface. The interface may provide a slider or a numerical input filed for receiving a filter setting. In step 203, a filter from a family of filters associated with the received filter type is selected by a computer processor based on the filter setting received in step 201. The algorithm used to filter selection may be a set of pre-programmed instructions stored on a computer readable memory device.

The family of filters includes filters that are approximations of a same function on different orders. Mathematical functions used for image filtering, such as the Gaussian function, can be approximated by filter functions on different orders to increase the speed of filter application. An order of the filter is defined as a number describing the highest exponent in the numerator or denominator of the z-domain transfer function of a digital filter. The approximated filter function may be an infinite impulse response (IIR) filter. Typically, a higher order filter provides more accurate approximation of the function but requires more computing resources. Due to the feedback used in the computation, high order IIIR filters may have problems with instability, arithmetic overflow, and limit cycles. The demand on computing resources for applying a filter may also be affected by complexity the filter function, the size of the image, and the filter settings such as filter range or strength. For example, filtering a large image with a high order filter could require a processor (CPU or GPU) to handle very large numbers and be prone to floating point overflow or denormalization, resulting in inaccurate filtering result. In some instance, applying a high order filters may also cause the processor to perform a large number of operations which decreases the speed at which the filter can be applied. In some embodiments, when the computer processor executing a set of instructions projects that the filter setting and image size would result in low computing resource demand, a high order filter is selected; when the computer processor projects that the filter setting and image size would result in high computing resource demand, a low order filter is selected. In some embodiments, ranges of filter setting values are separated by one or more threshold values, and filter orders are assigned to each range of filter setting. The dynamic selection of filter orders can thus reduce numerical instability and increase the speed of an image filtering process. In step 205, the filter selected in step 203 is applied to the image. The filter can be applied by either a CPU or a GPU. CPUs and GPUs operating in single floating point (36 bit) are be more susceptible to instability and inaccuracy from floating point overflow error than those operating in double floating point (64 bit). In some embodiments, the dynamic selection of filter order can be selectively triggered depending on whether the processor (either CPU or GPU) performing the filtering is operating in 32-bit or 64-bit. In some embodiments, the threshold filter setting values for selecting between filter orders can be set differently depending on whether the processor performing the filtering is operating in 32-bit or 64 bit. In some embodiments, the filter is applied separately along the x-axis (pixel row) and the y-axis (pixel column) of the image. In some embodiments, after a first application of the filter, the processor is adapted to detect instability in the filter application. When instability is detected in a previous filter application, the lower order filter from the same filter family is selected and reapplied to the original image to produce an output image. In some embodiments, the highest possible order filter is first applied, and an estimated instability is calculated. If the estimated instability surpasses a predetermined acceptability threshold, the next lower order filter is applied. The process is repeated for the lower order filter until the calculated estimated instability is below the acceptability threshold.

In some embodiments, prior to applying the filter in step 205, parameters used in the filters are determined based on the filter setting. In some embodiments, the parameters can be retrieved from a look-up table. For example, look-up tables may contain parameters for a range of possible filter setting values for each filter in the filter family. In some embodiments, the parameters are calculated receiving the filter settings by minimizing an error function of the selected filter using numerical optimization techniques. The error function is a function for determining how closely a filter approximates a function, such as a Gaussian function. In some embodiments, parameter values for some filter settings are stored in a look-up table while parameters for other filter settings are calculated after the receiving of filter settings.

Figure 3:
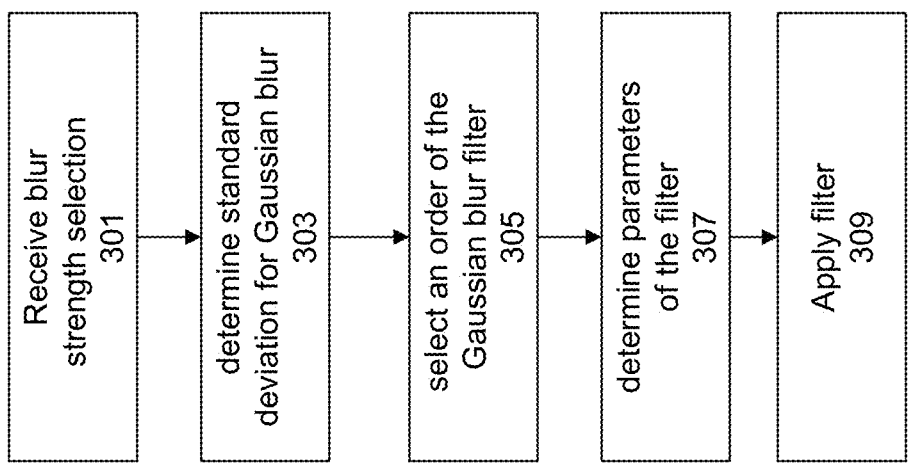
FIG. 3 is a flow diagram of a process of for applying a Gaussian blur filter to an image, according to one or more embodiments.

Referring next to FIG. 3, a process for applying a Gaussian blur filter to an image is shown. A blur filter is a filter widely used in graphic software to reduce image noise and detail. Blur can also be applied to selected portions of an image to produce various effects. One type of a blur commonly utilized is the Gaussian blur, which convolves an image with a Gaussian function to reduce the image's high-frequency components. During the convolution operation, values of each pixel of the image are calculated from a weighted average of its neighboring pixel. The visual effect of a blur filter resembles that of viewing the image through a translucent screen. In step 301, a blur strength selection is received. The blur strength may correspond to the range of the image that is included for the calculation of a weighted average for determining a new value of a pixel to perform the blur. A higher the blur strength value would result in a filtered image that appears more blurred as compared to the original image. In some embodiments, blur strength for pixel column and pixel row are set separately. In some embodiments, the user may select from one direction blur (along the x-axis/row or y-axis/column) and bi-directional blur.

In step 303, the standard deviation of the Gaussian function used to perform the Gaussian blur is determine based on the received blur strength. In some embodiments, the inputted blur strength value may be the standard deviation of the Gaussian function thus requiring no further calculation. In some embodiments, the blur strength value may be representative of the number of pixels to be averaged or the number of pixels within the standard deviation of a Gaussian blur. In some embodiments, the received blur strength value is dependent on the size of the image. For example, the strength value may represent the amount of blur applied to the image as perceived on a user's screen, in which the image may be zoomed in or out as compared to the true pixel size of the image. In such case, the size of the image and the blur strength value are both taken together to determine the standard deviation value. In some embodiments, the blur strength is a value between 0 and 1.

Figure 4:
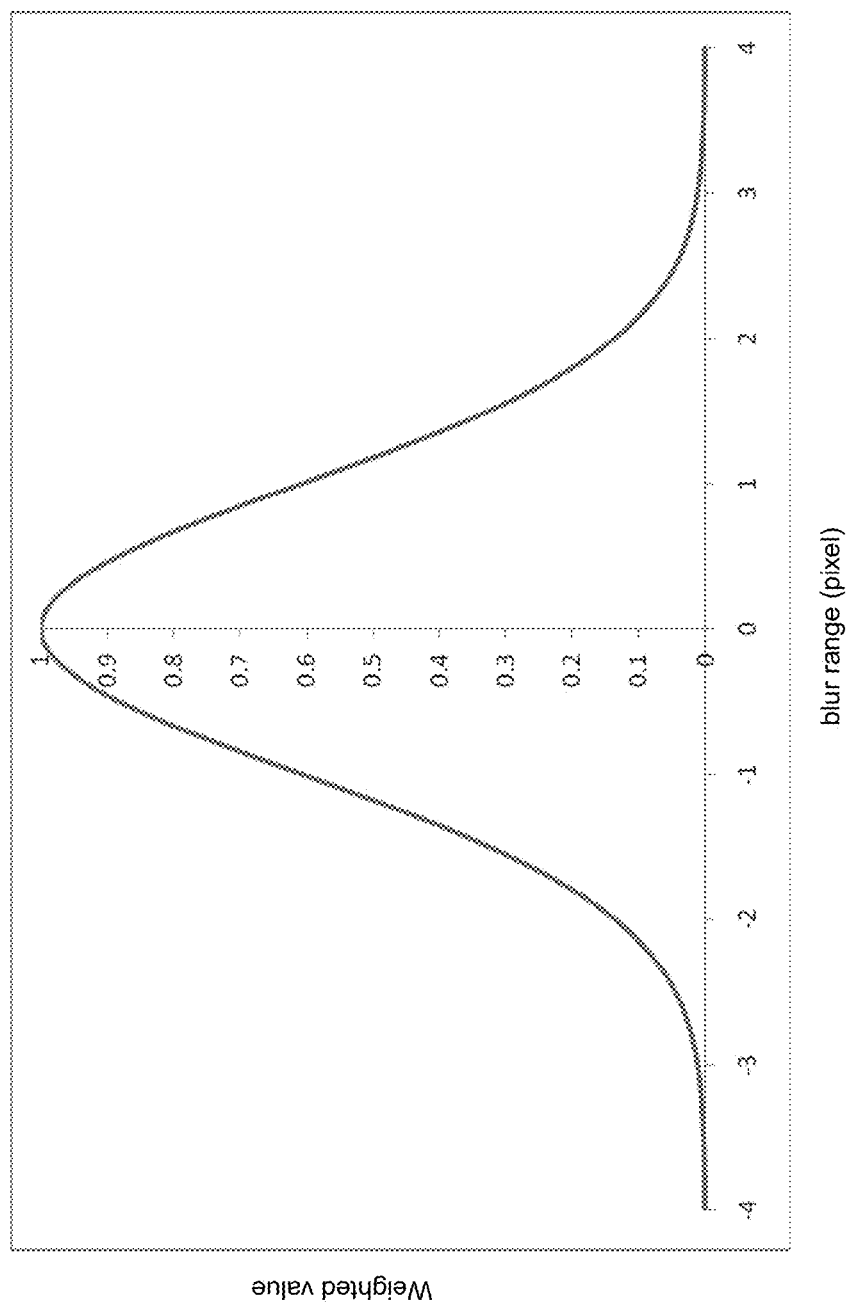
FIG. 4 is a graph illustrating a Gaussian function, according to one or more embodiments.

FIG. 4 illustrates a Gaussian function with a standard deviation ($\sigma$) of 1 pixel. When the Gaussian function is applied, the pixel at the location represented on the x-axis of the curve is weighted by the corresponding value on the y-axis of the curve. While in a true Gaussian function extends indefinitely in both directions on the x-axis, in applications using approximated Gaussian filters, the pixels in ranges where the weighted value (y-axis) falls below a threshold level are sometimes omitted from the calculation. In the descriptions, an approximation of the Gaussian function used for applying a blur via a processor is sometimes simply referred to as a Gaussian filter. The weighted average of the pixel values are then applied as the value of the pixel at location 0 on the x-axis.

In step 305, the processor selects one filter from a family of Gaussian filters based on the standard deviation determined in step 303. The family may include a number of filters each being an approximation of the Gaussian functions on different orders. The order of the filter is the highest exponent in the numerator or denominator of the z-domain transfer function of the filter. A higher order filter is selected for a low standard deviation value and a lower order filter is selected for a high standard deviation value. In some embodiments, the family of Gaussian filters comprises a fourth order Gaussian filter, a third order Gaussian filter, and a second order Gaussian filter. The fourth order Gaussian filter is selected if the standard deviations values is equal to or below a first threshold, the third order Gaussian filter is selected if the standard deviation value is above the first threshold and equal or below a second higher threshold, and the second order Gaussian filter is selected if the standard deviation value values is above the second threshold. In other embodiments, the filter family may further include a first order Gaussian filter, a fifth order Gaussian filter, and/or a sixth order Gaussian filter etc.

In step 307, parameters of the selected Gaussian filter are determined In some embodiments, the parameters are calculated after the Gaussian filter is selected. The parameters may be calculated by minimizing a normalized mean square error function of the selected Gaussian filter which enumerates how well the filter approximates a Gaussian function. In some embodiments, the parameters are retrieved from a look-up table. For example, for each of the Gaussian filters in the filter family, pre-calculated parameters may be stored in the look-up for a range of standard deviation values. In some embodiments, parameters for some of the standard deviation values are pre-calculated and stored, and parameters for other standard deviation values are calculated after a filter is selected. For example, in some embodiments, when standard deviations is between 1-10, a fourth order Gaussian filter may selected, and the parameters may retrieved from a look-up table; when standard deviation is between 10.1 to 30, a third order Gaussian filter may be selected, and the parameters may be calculated from the standard deviation value.

In step 309, the selected Gaussian filter is applied to the image with the parameters determined in step 307. In some embodiments in which a directional blur is selected by the user, and the blur filter is only applied to one of the x-axis or the y-axis of the image. In some embodiments, the Gaussian filter is a one-dimensional filter, and the filter is applied to the pixel columns and the pixel rows of the image separately. In some embodiments, the Gaussian filter is sampled at locations of the pixels to produce filter kernels prior to applying the filter to the image. In some embodiments, pixel columns and pixel rows may be filtered by different Gaussian filters with different parameters.

Example designs of Gaussian filters that may be included in the filter families described with reference to FIGS. 1-3 are shown below. Parameters of the filters are sometimes referred to as coefficients.

Typically, filtering a signal $x_i$ by a size k filter $h_k$ in order to obtain output $y_i$ can be achieved by the following convolution operation:

$$y_i = \sum_{k=0}^{N-1} h_k x_{i-k}$$

To reduce the number of processor operations used for calculating the output, functions for approximating this calculation may be used. A Gaussian filter used in image processing and computer vision may by given by $$g(x) = e^{-\frac{x^2}{2\sigma^2}}$$

An example of the above Gaussian function for σ=1 is shown in FIG. 4.

A recursive filter for implementing an approximation of the Gaussian function can be given by $$h_a(k) = \sum_{i=0}^{n} a_i e^{-\frac{\lambda_i k}{\sigma}}$$

In the above equation, i represent the filter order, and coefficients $a_i$ and $\lambda_i$ are parameters for approximation. The coefficients $a_i$ and $\lambda_i$ may be calculated by minimized a mean square error function of the Gaussian recursive filter.

$$\varepsilon^2 = \frac{\sum_{k=o}^{N}(h(k) - h_a(k))^2}{\sum_{k=o}^{N}(h(k))^2}$$

In the above equation, h(k) is the Gaussian function, and $h_a(k)$ is the selected Gaussian filter for approximating the Gaussian function. The value of N corresponds to range of the function to be considered in the determination of accuracy of the approximation. In some embodiments, the value of N corresponds to a threshold weighting value below which the value of the corresponding pixel is omitted form the calculation of the weighted average. The value of N may be, for example, 10σ. The mean square error function may be minimized using numerical optimization techniques to determine the values of coefficients in $h_a(k)$. In some embodiments, the form GSL-GNU Scientific Library [5] function gsl_mullimin_fminimizer_nmsimplex2 is used for minimizing the cost function describing the error given by equation.

In one design of a fourth order Gaussian filter, assuming coefficients $a_i$ and $\lambda_i$ may be complex but conjugate, the filter may be described by the following equation.

$$h_{a(n)} = \left(a_0\cos\left(\frac{w_0 n}{\sigma}\right) + a_1\sin\left(\frac{w_0 n}{\sigma}\right)\right)e^{-\frac{b_0 n}{\sigma}} + \left(c_0\cos\left(\frac{w_1 n}{\sigma}\right) + c_1\sin\left(\frac{w_1 n}{\sigma}\right)\right)e^{-\frac{b_1 n}{\sigma}}$$

Coefficients $a_i$, $b_i$, $w_i$ can be obtained by numerical optimization described above. Once the coefficients are obtained, $n_i$ and $d_i$ of the z-transform of the above equation can be calculated. Z-transform of the fourth order Gaussian filter shown above is $$F(z^{-1}) = \frac{n_0 + n_1 z^{-1} + n_2 z^{-2} + n_3 z^{-3}}{1 + d_1 z^{-1} + d_2 z^{-2} + d_3 z^{-3} + d_4 z^{-4}}$$

The coefficients $n_i$ and $d_i$ may be as follows:

$$n_0 = a_0 + c_0$$

$$n_1 = a_1\sin\left(\frac{w_0}{\sigma}\right)e^{-\frac{b_0}{\sigma}} - 2c_0\cos\left(\frac{w_0}{\sigma}\right)e^{-\frac{b_0}{\sigma}} - c_0\cos\left(\frac{w_1}{\sigma}\right)e^{-\frac{b_1}{\sigma}} - 2a_0\cos\left(\frac{w_1}{\sigma}\right)e^{-\frac{b_1}{\sigma}} + c_1\sin\left(\frac{w_1}{\sigma}\right)e^{-\frac{b_1}{\sigma}} - a_0\cos\left(\frac{w_0}{\sigma}\right)e^{-\frac{b_0}{\sigma}}$$

$$n_2 = a_0 e^{-2\frac{b_1}{\sigma}} - 2c_1\sin\left(\frac{w_1}{\sigma}\right)e^{-\frac{b_0+b_1}{\sigma}}\cos\left(\frac{w_0}{\sigma}\right) - 2a_1\sin\left(\frac{w_0}{\sigma}\right)e^{-\frac{b_0+b_1}{\sigma}}\cos\left(\frac{w_1}{\sigma}\right) + 2c_0\cos\left(\frac{w_0}{\sigma}\right)e^{-\frac{b_0+b_1}{\sigma}}\cos\left(\frac{w_1}{\sigma}\right) + 2a_0\cos\left(\frac{w_0}{\sigma}\right)e^{-\frac{b_0+b_1}{\sigma}}\cos\left(\frac{w_1}{\sigma}\right) + c_0 e^{-2\frac{b_0}{\sigma}}$$

$$n_3 = c_1\sin\left(\frac{w_1}{\sigma}\right)e^{-\frac{b_1+2b_0}{\sigma}} - c_0\cos\left(\frac{w_1}{\sigma}\right)e^{-\frac{b_1+2b_0}{\sigma}} + a_1\sin\left(\frac{w_0}{\sigma}\right)e^{-\frac{b_0+2b_1}{\sigma}} - a_0\cos\left(\frac{w_0}{\sigma}\right)e^{-\frac{b_0+2b_1}{\sigma}}$$

$$d_1 = -2\cos\left(\frac{w_1}{\sigma}\right)e^{-\frac{b_1}{\sigma}} - 2\cos\left(\frac{w_0}{\sigma}\right)e^{-\frac{b_0}{\sigma}}$$

$$d_2 = e^{-2\frac{b_1}{\sigma}} + 4\cos\left(\frac{w_0}{\sigma}\right)e^{-\frac{b_0+b_1}{\sigma}}\cos\left(\frac{w_1}{\sigma}\right) + e^{-2\frac{b_0}{\sigma}}$$

$$d_3 = -2\cos\left(\frac{w_0}{\sigma}\right)e^{-\frac{b_0+2b_1}{\sigma}} - 2e^{-\frac{b_1+2b_0}{\sigma}}\cos\left(\frac{w_1}{\sigma}\right)$$

$$d_4 = e^{-2\frac{b_0+b_1}{\sigma}}$$

In one design of a third order Gaussian filter, assuming coefficients $a_i$ and $\lambda_i$ may be complex but conjugate, the filter may be described by the following equation.

$$h_{a(n)} = a_0 e^{-\frac{b_0 n}{\sigma}} - \left(a_1\cos\left(\frac{w_0 n}{\sigma}\right) - a_2\sin\left(\frac{w_0 n}{\sigma}\right)\right)e^{-\frac{b_1 n}{\sigma}}$$

Z-transform of the third order Gaussian filter shown above is $$F(z^{-1}) = \frac{n_0 + n_1 z^{-1} + n_2 z^{-2}}{1 + d_1 z^{-1} + d_2 z^{-2} + d_3 z^{-3}}$$

The coefficients $n_i$ and $d_i$ may be as follows:

$$n_0 = a_0 - a_1$$

$$n_1 = -2a_0\cos\left(\frac{w_0}{\sigma}\right)e^{-\frac{b_1}{\sigma}} + a_2\sin\left(\frac{w_0}{\sigma}\right)e^{-\frac{b_1}{\sigma}} + a_1 e^{-\frac{b_0}{\sigma}} + a_1\cos\left(\frac{w_0}{\sigma}\right)e^{-\frac{b_1}{\sigma}}$$

$$n_2 = -a_2\sin\left(\frac{w_0}{\sigma}\right)e^{-\frac{b_0+b_1}{\sigma}} + a_0 e^{-2\frac{b_1}{\sigma}} - a_1\cos\left(\frac{w_0}{\sigma}\right)e^{-\frac{b_0+b_1}{\sigma}}$$

$$d_1 = -e^{-\frac{b_0}{\sigma}} - 2\cos\left(\frac{w_0}{\sigma}\right)e^{-\frac{b_1}{\sigma}}$$

$$d_2 = 2e^{-\frac{b_0}{\sigma}}\cos\left(\frac{w_0}{\sigma}\right)e^{-\frac{b_1}{\sigma}} + e^{-2\frac{b_1}{\sigma}}$$

$$d_3 = -e^{-\frac{b_0}{\sigma}}e^{-2\frac{b_1}{\sigma}}$$

In one design of a second order Gaussian filter, assuming coefficients $a_i$ and $\lambda_i$ may be complex but conjugate, the filter may be described by the following equation.

$$h_{a(n)} = \left(a_1 \cos\left(\frac{w_0 n}{\sigma}\right) - a_2 \sin\left(\frac{w_0 n}{\sigma}\right)\right) e^{-\frac{b_0 n}{\sigma}}$$

Z-transform of the second order Gaussian filter shown above is $$F(z^{-2}) = \frac{n_0 + n_1 z^{-1}}{1 + d_1 z^{-1} + d_2 z^{-2}}$$

The coefficients $n_i$ and $d_i$ may be as follows:

$$n_0 = a_1$$

$$n_1 = -a_1 \cos\left(\frac{w_0}{\sigma}\right) e^{-\frac{b_0}{\sigma}} - a_2 \sin\left(\frac{w_0}{\sigma}\right) e^{-\frac{b_0}{\sigma}}$$

$$d_1 = -2\cos\left(\frac{w_0}{\sigma}\right) e^{-\frac{b_0}{\sigma}}$$

$$d_2 = -e^{-\frac{b_0}{\sigma}}$$

Exemplary designs of the fourth, third, and second order Gaussian blur filters are shown here only for the purpose of illustration. Other filter designs can be used in the implementation of system and processes shown in FIGS. 1-3. Furthermore, the dynamic switching of filter orders as described in FIGS. 1 and 2 may be applied to any functions used for image filtering that can be approximated by IIR filters to reduce instability and increase processing speed.

In the current implementations of image filtering, GPUs are increasing being utilized to perform calculations in place of or in addition to the CPU. While GPUs architectures enables efficient graphic processing, in many GPUs, double precision floating point numbers are not available or not used due to speed. Numerical instability and inaccuracy can occur when image filtering algorithms are ported to GPUs, and the likelihood of occurrence increases with a large amount of computing demand (i.e. large standard deviation in a Gaussian function). The resulting image could contain unexpected noise or distortion. Through dynamically switching between higher and lower order filters, numerical instability caused by numerical overflow in a single precision floating point GPU may be effectively reduced. The dynamically switching of filters may also increase the speed of filter application in some instances, whether the filtering is applied using a GPU, CPU, or a combination of the two, without substantially sacrificing accuracy. The increased speed can enables real time processing of high-definition videos with hardware that might not have been able to operate at sufficient speed when executing other methods.

Many of the processes in the specification have been described as implemented by a processor executing a set of computer readable instructions or code. The executable code could be a single instruction, or many instructions, and may even be distributed over several different code segments, among different programs, and across several memory devices. Similarly, operational data such as filter setting, filter parameters, and image file may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

The invention claimed is:

1. A computer-implemented method for applying a filter to an image comprising:
   receiving a filter setting;
   selecting a selected filter from a family of filters stored on a computer-readable storage medium, based at least on the filter setting, wherein the family of filters comprises a plurality of filters each being an approximation of a function on different orders;
   determining parameters of the selected filter; and
   applying the selected filter to a stored image with a processor;
   wherein the family of filters comprise Gaussian blur filters and the filter setting comprises blur strength;
   wherein the Gaussian blur filter is an approximation of a Gaussian function represented by $$h_a(k) = \sum_{i=0}^{n} a_i e^{-\frac{\lambda_i k}{\sigma}};$$

wherein σ is a standard deviation value based at least on the blur strength, i is a filter order, $a_i$ and $\lambda_i$ are parameters; and
   wherein determining parameters of the Gaussian blur filter comprises calculating $a_i$ and $\lambda_i$ by minimizing a mean square error function of $h_a(k)$.

2. The method of claim 1, wherein selecting the selected filter from the family of filters comprises selecting a lower order filter as a projected computing resource demand corresponding to the filter setting increases.

3. The method of claim 1, wherein the filter setting is dependent on a size of the stored image, and the selecting of the selected filter is based at least on the size of the stored image.

4. The method of claim 1, wherein the selected filter is a one-dimensional filter, and the filter is separately applied to pixel rows of the image and pixel columns of the image.

5. The method of claim 1, further comprising:
   calculating an estimated instability in a previous filter application,
   wherein, in the event the estimated instability is above an acceptability threshold, the selecting of the filter comprises selecting a filter with an order that is lower relative to a filter used in the previous filter application.

6. A system for applying a filter to an image comprising:
   a processor;
   a memory; and
   an input device;
   wherein, upon execution of an executable program instructions stored on the memory, the system is configured to:
      receive a filter setting from the input device;
      select a selected filter from a family of filters stored on the memory, based at least on the filter setting, wherein the family of filters comprises a plurality of filters each being an approximation of a function on different orders;
      determine parameters of the selected filter; and
      apply the selected filter to a stored image;
   wherein the family of filters comprises Gaussian blur filters and the filter setting comprises blur strength;

wherein the Gaussian blur filter is an approximation of a Gaussian function represented by $$h_a(k) = \sum_{i=0}^{n} a_i e^{-\frac{\lambda_i k}{\sigma}}$$

wherein σ is a standard deviation value based at least on the blur strength, i is a filter order, $a_i$ and $\lambda_i$ are parameters; and wherein determine parameters of the Gaussian blur filter comprises calculating $a_i$ and $\lambda_i$ by minimizing a mean square error function of $h_a(k)$.

7. The system of claim 6, further comprising:
a graphic processor; wherein the graphic processor is configured to apply the selected filter to the stored image.

8. The system of claim 6, wherein the system selects the selected filter from the family of filters by selecting a lower order filter as a projected computing resource demand corresponding to the filter setting increases.

9. The system of claim 6, wherein the filter is a one-dimensional filter, and the filter is separately applied to pixel rows of the image and pixel columns of the image.

10. The system of claim 6, wherein the processor is further configured to:
calculate an estimated instability in a previous filter application; and
wherein, in the event that the estimated instability is higher than an acceptability threshold, the processor is adapted to select a filter with an order lower than a filter used in the previous filter application as the selected filter.

11. The system of claim 6, wherein the filter setting is dependent on a size of the stored image, and the selecting of the selected filter is based at least on the size of the image.

12. A computer-implemented method for applying a blur to an image comprising:
receiving a blur strength;
determining a standard deviation value based at least on the blur strength;
selecting a Gaussian blur filter from a family of Gaussian blur filters stored on a computer-readable storage medium based on the standard deviation value;
determining parameters of the Gaussian blur filter; and
applying the filter to an image with a processor;
wherein the Gaussian blur filter is an approximation of a Gaussian function represented by $$h_a(k) = \sum_{i=0}^{n} a_i e^{-\frac{\lambda_i k}{\sigma}};$$

wherein σ is the standard deviation value, i is a filter order, $a_i$ and $\lambda_i$ are parameters; and
wherein determining parameters of the Gaussian blur filter comprises calculating $a_i$ and $\lambda_i$ by minimizing a mean square error function of $h_a(k)$.

13. The method of claim 12 wherein the family of filters comprises a second order Gaussian blur filter, a third order Gaussian blur filter, and a fourth order Gaussian blur filter.

14. A computer-implemented method for applying a blur to an image comprising:
receiving a blur strength;
determining a standard deviation value based at least on the blur strength;
selecting a Gaussian blur filter from a family of Gaussian blur filters stored on a computer-readable storage medium based on the standard deviation value;
determining parameters of the Gaussian blur filter; and
applying the filter to an image with a processor;
wherein the family of filters comprises a second order Gaussian blur filter, a third order Gaussian blur filter, and a fourth order Gaussian blur filter; and
wherein selecting the Gaussian blur filter from a family of filters comprises:
selecting the fourth order Gaussian blur filter if the standard deviation value is equal or below a first threshold;
selecting the third order Gaussian blur filter if the standard deviation value is above the first threshold and equal or below a second threshold; and
selecting the second order Gaussian blur filter if the standard deviation value is above the second threshold.

15. The method of claim 12 wherein the determining of the standard deviation is further based at least on an image size of the image.

\* \* \* \* \*